US012267291B2

(12) United States Patent
Subrahmanyam

(10) Patent No.: US 12,267,291 B2
(45) Date of Patent: Apr. 1, 2025

(54) TOKENIZED IDENTIFICATION ISSUANCE FOR SECURE DISCRETIZED NETWORK COMMUNICATION CHANNEL

(71) Applicant: Consumer Retail Tech Solutions Corporation, Monroe Township, NJ (US)

(72) Inventor: Manikanth Subrahmanyam, Monroe Township, NJ (US)

(73) Assignee: CONSUMER RETAIL TECH SOLUTIONS CORPORATION, NJ (US)

( * ) Notice: Subject to any disclaimer, the term of this patent is extended or adjusted under 35 U.S.C. 154(b) by 360 days.

(21) Appl. No.: 17/702,045

(22) Filed: Mar. 23, 2022

(65) Prior Publication Data

US 2022/0321519 A1  Oct. 6, 2022

Related U.S. Application Data

(60) Provisional application No. 63/169,351, filed on Apr. 1, 2021.

(51) Int. Cl.
| | |
|---|---|
| *H04L 51/42* | (2022.01) |
| *H04L 51/212* | (2022.01) |
| *H04L 51/58* | (2022.01) |
| *H04W 4/12* | (2009.01) |

(52) U.S. Cl.
CPC ............ *H04L 51/58* (2022.05); *H04L 51/212* (2022.05); *H04L 51/42* (2022.05); *H04W 4/12* (2013.01)

(58) Field of Classification Search
CPC ....... H04L 51/58; H04L 51/42; H04L 51/217; H04W 4/12

USPC .......................................... 709/206, 220–228
See application file for complete search history.

(56) References Cited

U.S. PATENT DOCUMENTS

| | | | | |
|---|---|---|---|---|
| 9,639,694 | B2 * | 5/2017 | Padidar | H04L 63/1425 |
| 2003/0095555 | A1 * | 5/2003 | McNamara | H04L 49/25 |
| | | | | 370/401 |
| 2004/0087300 | A1 * | 5/2004 | Lewis | H04W 4/12 |
| | | | | 455/412.2 |
| 2006/0281443 | A1 * | 12/2006 | Chen | H04W 4/12 |
| | | | | 455/413 |
| 2008/0109448 | A1 * | 5/2008 | Aboel-Nil | G06Q 10/107 |

(Continued)

FOREIGN PATENT DOCUMENTS

| | | | | | |
|---|---|---|---|---|---|
| AU | 2014308610 | A1 * | 4/2016 | ......... | G06F 21/6218 |
| CA | 3017942 | A1 * | 9/2017 | ............ | G06F 17/40 |
| CN | 1804879 | A * | 7/2006 | | |

*Primary Examiner* — Khanh Q Dinh
(74) *Attorney, Agent, or Firm* — Daylight Law, P.C.

(57) ABSTRACT

A system includes a system server programmed to receive a mobile number of a mobile device, associate the mobile number with a mailbox, and provide, in exchange for the mobile number, a mailbox address for the mailbox. The system also includes a mailbox server programmed to provide the mailbox and receive a set of electronic messages addressed to the mailbox address. The system also includes a secure channel to communicate with an application on the mobile device. The secure channel is secured using the mobile number. The system server is further programmed to extract content from the set of electronic messages to obtain extracted content and transmit the extracted content to the application via the secure channel.

15 Claims, 11 Drawing Sheets

(56) References Cited

U.S. PATENT DOCUMENTS

| | | | | |
|---|---|---|---|---|
| 2010/0107044 | A1* | 4/2010 | Li | H04M 1/72436 |
| | | | | 715/201 |
| 2012/0030293 | A1* | 2/2012 | Bobotek | H04L 51/00 |
| | | | | 709/206 |
| 2013/0304742 | A1* | 11/2013 | Roman | H04L 51/212 |
| | | | | 707/740 |
| 2014/0082633 | A1* | 3/2014 | Kim | G06Q 10/103 |
| | | | | 719/313 |
| 2016/0142390 | A1* | 5/2016 | Draegen | H04L 51/212 |
| | | | | 726/9 |
| 2019/0036930 | A1* | 1/2019 | Bartik | G06F 21/577 |
| 2019/0073700 | A1* | 3/2019 | Mesa | G06Q 30/0277 |

* cited by examiner

300

301

302

303

601

602

TOKENIZED IDENTIFICATION ISSUANCE FOR SECURE DISCRETIZED NETWORK COMMUNICATION CHANNEL

CROSS REFERENCE TO RELATED APPLICATIONS

This application claims the benefit of U.S. Provisional Patent Application No. 63/169,351, filed Apr. 1, 2021, which is incorporated by reference herein in its entirety for all purposes.

BACKGROUND

Today, consumers are chased everywhere, whether on social media, via personal email addresses, phone numbers, GPS tracking, etc. The pandemic has resulted in an exponential adoption of the mobile world, such that there is a plethora of spam through emails, mobile apps and various websites and shopping platforms. This situation not only leads to frustrated consumers, but also cybercrimes. Worldwide email traffic know exceeds 300 billion emails a day, and according to the FBI records phishing via email is one of the most common types of cybercrime. In the 2020 Internet Crime Report, the FBI reported 241,342 complaints, with adjusted losses of over $54 million, due to phishing scams. While on the other hand, brands and advertisers waste about 25% of their marketing budgets due to inefficient channels and wrong targeting. That's about $6 billion dollars every year in the US alone.

SUMMARY

Systems and method related to the issuance of tokenized identifications and management of data based on such tokenized identification are disclosed herein. The systems and methods disclosed can provide a secure and efficient mechanism for creating a tokenized identification based on a non-tokenized identification, such as a mobile number and/or device ID. In this way, users of the system can share their tokenized identification to receive content, such as electronic messages from different sources, while keeping their non-tokenized identification private. The systems and methods disclosed herein can also provide a secure and efficient mechanism for managing data received via the tokenized identification. The management of the data can be performed by the creation of a mailbox associated to the non-tokenized identification for receiving the messages addressed to the tokenized identification. The systems can include servers and databases configured to verify the authenticity of the non-tokenized identification, issue the tokenized identification, create the mailbox, process incoming data, classify the data, provide extracted content from the processing and classifying of the data or metadata related to the data, and provide a user-friendly interface to the users to present the data. The data can be provided to the users via an application running on a user's device. The application can access the data via a secure discretized network communication channel with the system. The channel can be secured using the non-tokenized identification of the users.

In specific embodiments of the invention, a system is provided. The system comprises a system server, programmed to: receive a mobile number of a mobile device; associate the mobile number with a mailbox; and provide, in exchange for the mobile number, a mailbox address for the mailbox. The system also comprises a mailbox server, programmed to: provide the mailbox; and receive a set of electronic messages addressed to the mailbox address. The system also comprises a secure channel to communicate with an application on the mobile device. The secure channel is secured using the mobile number. The system server is further programmed to: extract content from the set of electronic messages to obtain extracted content; and transmit the extracted content to the application via the secure channel.

In specific embodiments of the invention, a method is provided in which each step is conducted by a computerized system executing stored instructions. The method comprises receiving, using a system server, a mobile number of a mobile device; associating, using the system server, the mobile number with a mailbox; providing, using the system server and in exchange for the mobile number, a mailbox address for the mailbox; providing, using a mailbox server, the mailbox; receiving, using the mailbox server, a set of electronic messages addressed to the mailbox address; and communicating, using a secure channel, with an application on the mobile device. The secure channel is secured using the mobile number. The method also comprises extracting, using the system server, content from the set of electronic messages to obtain extracted content; and transmitting, using the system server, the extracted content to the application via the secure channel.

In specific embodiments of the invention, a system is provided. The system comprises a system server, programmed to: receive a non-tokenized identification; associate the non-tokenized identification with a mailbox; and provide, in exchange for the non-tokenized identification, a mailbox address for the mailbox. The system also comprises a mailbox server, programmed to: provide the mailbox; and receive a set of electronic messages addressed to the mailbox address. The method also comprises a secure channel to communicate with an application on a device. The non-tokenized identification is a credential of the secure channel. The system server is further programmed to: extract content from the set of electronic messages to obtain extracted content; and transmit the extracted content to the device via the secure channel.

DETAILED DESCRIPTION

Systems and methods related to the issuance of tokenized identifications and management of data based on such tokenized identification in accordance with the summary above are disclosed in detail herein. The systems and methods disclosed can provide a secure and efficient mechanism for creating a tokenized identification based on a non-tokenized identification, such as a mobile number and/or device ID. The systems and methods disclosed can also provide a secure and efficient mechanism for managing data received via the tokenized identification, such as processing incoming data, classifying data, providing content extracted from the processing of the data or metadata related to the data to external agents of the systems, and the like.

The systems and methods disclosed in this section are nonlimiting embodiments of the invention, are provided for explanatory purposes only, and should not be used to constrict the full scope of the invention. Although the specific examples provided in this section are directed to the provision of a mailbox and a mail processing system based on a tokenized identification, the approaches disclosed herein are broadly applicable to systems involving other kinds of data for which a tokenized identification is issued and used for managing such data. Although the specific examples provided in this section are directed to the use of an application running on a mobile device, the approaches disclosed herein are broadly applicable to systems involving a desktop solution, a webpage or any other means that provide an interface for the user to interact with the system.

Figure 1:
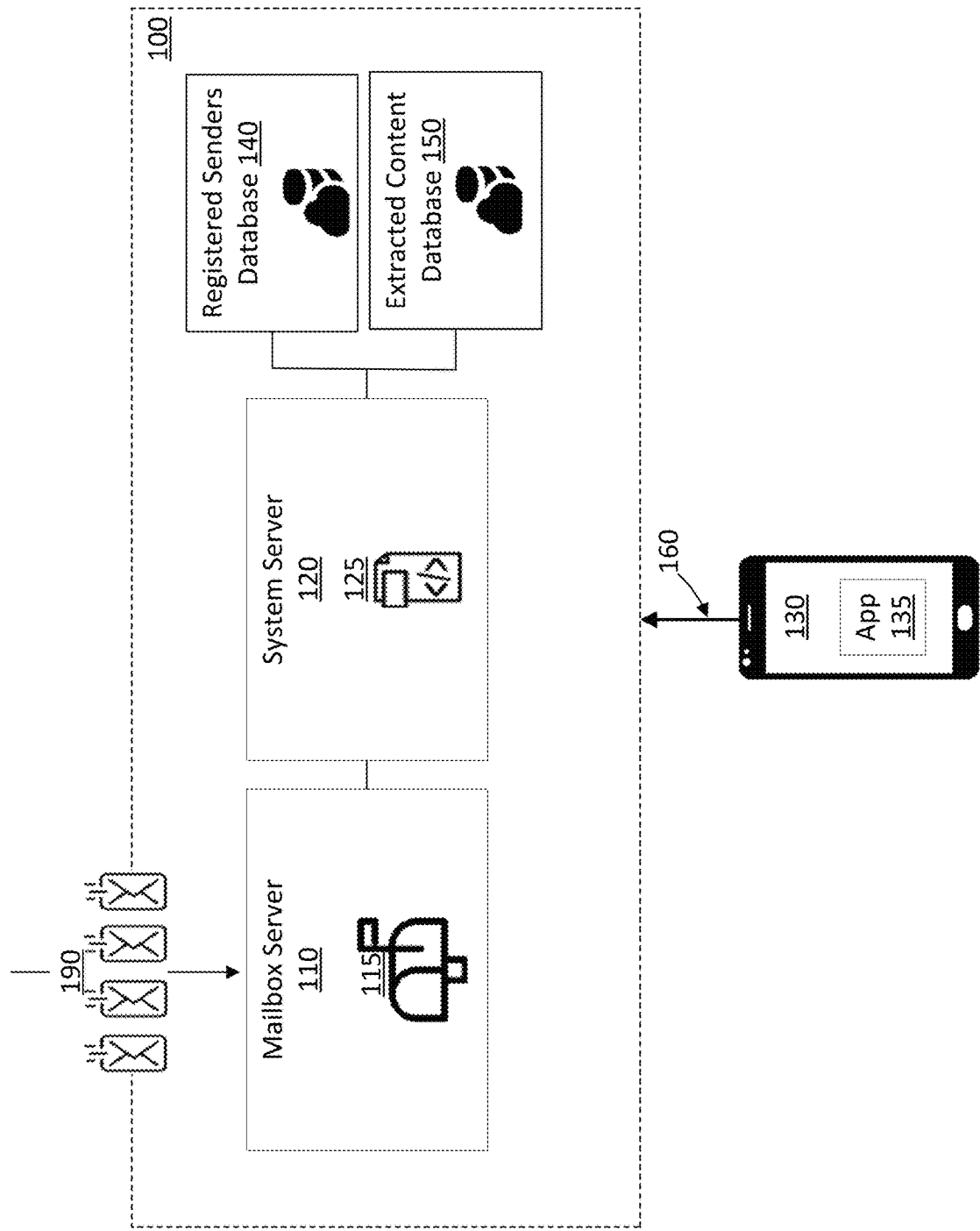
FIG. 1 includes a block diagram of a system in accordance with specific embodiments of the invention disclosed herein.

FIG. 1 includes a block diagram of a system 100 in accordance with specific embodiments of the invention disclosed herein. The system 100 illustrated in FIG. 1 includes a mailbox server 110, a system server 120, a registered senders database 140, and an extracted content database 150. The registered senders database can be a pre-built database with sender information that evolves as an administrator of the system adds additional senders and domains to the system. The system server 120 can administrate the creation of mailboxes, implement a mail processing script, filter emails with reference to registered senders database 140, and store content in extracted content database 150. The system 100 can access additional servers and/or databases. The additional servers and/or databases can be provided as part of the system or be external resources that the system 100 can make use of.

The architecture of the systems in accordance with the present invention could take on various forms. In the example of FIG. 1, the servers and databases are illustrated as dedicated blocks to facilitate the explanation of the different functions that the system 100 could perform. However, the architecture of the systems in accordance with the present invention is not limited to the architecture illustrated in FIG. 1. For example, the systems in accordance with specific embodiments of the invention could be represented by a single data center where the servers and databases could be implemented and/or distributed in different ways and still perform the different functions disclosed herein. The system 100 could be part of a cloud architecture with dynamic allocation of resources as the system escalates. The different blocks in system 100 of the example of FIG. 1 could be implemented in a single server or server cluster. The illustrated servers could be a single server or a server cluster. The illustrated databases could be a single database or a database cluster. The databases could be implemented as part of the servers. Other configurations known to a person skilled in the art of computer systems and architecture are also possible.

The servers mentioned in this disclosure can perform various functions and methods. The servers can be programmed to execute instructions stored in a non-transitory computer-readable medium. The computer-readable medium may be memory within the servers or a network accessible memory, such as a shared memory of the system 100. The servers can include one or more processors to execute the instructions stored in memory. In this way, servers can run a software for its intended purpose.

A system server, such as system server 120 of FIG. 1, can be the server that manages the databases of the system. For example, the system server can push data into, and retrieve data from, the databases. The system server can process data to be stored into the database in accordance with certain embodiments of the invention. The system server can provide data from the databases externally to the system in accordance with certain embodiments of the invention. Although system server 120 is illustrated as a generic module for performing certain functions disclosed herein, each of those functions could be performed by individual modules, such as individual servers or software modules within the server.

The system server can be programmed to receive data from and send data to an agent external to the system. The external agent can be an end user, a device such as a mobile device, an application such as a mobile device application, a website, or any other external entity. In the example of FIG. 1, an application 135 running on mobile device 130 is illustrated as the external agent in communication with the system. The application 135 and the system server 120 can communicate via a communication channel, which can be a secure communication channel, as will be described below in more detail.

The system server can function as a tokenization server. The system server can be programmed to receive a non-tokenized identification from the external agent and provide a corresponding tokenized identification. The non-tokenized identification can be a mobile number of the mobile device 130. The non-tokenized identification can be a mobile ID of the mobile device 130, such as the IMEI, the MEID, or other ID of the device. The non-tokenized identification can also be an e-mail address, a user's personal credential, etc. The system mailbox server can be programmed to provide a tokenized identification in exchange for the non-tokenized identification. The tokenized identification can be a personal ID, such as an e-mail address, a username, a code, etc. In general, the non-tokenized identification is an identifying element of data that directly identifies a user or a user account through a given system such as the global telecommunications system, the Internet, a legal register of names with a government body, etc.

The system server is different than a conventional tokenization server in that the tokenized identification provided is not only a proxy for the non-tokenized identification but can also represent an instance of a process within the system. The system server can translate the non-tokenized identifications into tokenized identifications, store the relationship between the identifications, and at the same time instantiate a service based on such identifications. In specific embodiments of the invention disclosed herein, the service instantiated by the system server can be the generation of a mailbox, on mailbox server 110, associated with the tokenized identification. The tokenized identification could then be used to address the mailbox generated by the mailbox server. The tokenized identification could be, for example, a mailbox address, e-mail address, an ID for the mailbox, etc.

In order to support the generation of a mailbox associated with the tokenized identification, a mailbox server, such as mailbox server 110 of FIG. 1, can be provided. The mailbox server can be part of the system or external to the system. The mailbox server can receive a request from the system server to create a new mailbox for a mailbox address or ID. The mailbox server can be an isolated server used exclusively for the generation and maintenance of mailboxes. The mailbox server can receive messages addressed to the mailboxes. In specific embodiment of the invention, the mailbox server includes or is otherwise associated with an e-mail server to administrate e-mails received at the mailboxes. In specific embodiment of the invention, the mailbox server includes or is otherwise associated with a file storage so that messages received at the mailbox can be stored for later use for the system. The system server can access the content, such as e-mails, received by the mailbox server and process them in accordance with specific embodiments described in more detail below.

The use of a system in accordance with the specific embodiments of the present invention can be advantageous in that personal contact data such as phone numbers and e-mail addresses can be protected while still being indirectly used to receive, send and process data for the users. Users of the system could use and share, at their discretion, the tokenized identification provided by the system server instead of their personal contact information. In this way, the users can keep their personal contact information such as phone number and/or e-mail address private while still being able to receive content that would otherwise be received by sharing such personal contact information.

This feature could be particularly relevant for the management of secondary e-mails that are not part of the user's personal or work e-mail flow, such as e-mails from retailers and/or businesses, promotions, coupons, receipts, password reset or account configurations, rewards, order confirmations, transaction refund, among others. The users could use their tokenized identification in those scenarios. For example, the user could provide their tokenized identification, such as a mailbox address generated by the mailbox server, to merchants and retailers, instead of their personal e-mail address or other personal contact information. E-mails from those sources could then be received by the system 100 and pre-processed before being provided to the users, as will be explained below in more detail.

In order to provide the tokenized identification in exchange for the non-tokenized identification the system server can perform various steps. For example, the system server, such as system server 120, can receive the non-tokenized identification, such as a phone number for mobile device 130, and verify if such non-tokenized identification is not already associated with the system. If the non-tokenized identification is not associated with the system, the system server can proceed to associate it. In specific embodiments of the invention, the system server can send a One Time Password (OTP) to the mobile device for authentication and proceed with the association after a successful OTP authentication, as will be explained below in more detail.

The system server can associate the non-tokenized identification with the system by instantiating a service for the owner of the non-tokenized identification. The service can be the generation of a mailbox within the system associated with the particular non-tokenized identification, or the association of a mailbox already created within the system to the particular non-tokenized identification. Once the non-tokenized identification is associated with the system, the system server can provide and/or generate the tokenized identification.

The tokenized identification can be an address for the mailbox associated with the non-tokenized identification or any form of ID that unambiguously identifies the mailbox associated with the non-tokenized identification. The tokenized identification can be an e-mail address for the mailbox. The tokenized identification can be a code with embedded information that the system can process to identify a memory location associated with the mailbox. The tokenized identification can be an ID that the system can index, for example via look-up tables, for routing internal to the system. The tokenized identification can be of different forms, such as in the form of an e-mail address, a number, an alphanumeric code, a username, etc. The tokenized identification can explicitly indicate a relationship with the system, such as via an e-mail address that includes a domain exclusive to the system or can implicitly indicate such relationship by having embedded information of the system.

The above can be understood with reference back to the example of FIG. 1. System server 120 can be programmed to receive a non-tokenized identification, such as a mobile number, from mobile device 130. System server 120 can further be programmed to associate the mobile number with a mailbox, such as mailbox 115, and provide, in exchange for the mobile number, a tokenized identification, such as a mailbox address for the mailbox 115, back to the mobile device 130. Mailbox server 110 can create the mailbox 115, for example upon request from system server 120, and receive e-mails 190 sent to the mailbox address. The association between the tokenized identification and the non-tokenized identification can be stored by the system server 120 in a separate registered users database (not shown in the diagram). In this example, where the non-tokenized identification is in the form of a mobile number and the tokenized identification is in the form of an e-mail address, the user can use their tokenized identification, for sellers for example, like any other e-mail address. The e-mails sent to such e-mail address can be addressed to the mailbox 115 in system 100, and the mailbox 115 can in turn be indirectly linked to the mobile number of mobile device 130 so that the system can provide content thereto. From a system perspective, neither the phone number nor any other personal contact information needs to be shared in order for the user to receive the content in e-mails from those senders. Although certain registered senders may require additional information as part of their sign up procedures in order to being receiving content from those senders, system 100 itself will not itself require a user to externally share non-tokenized information.

A mobile device, such as mobile device 130, can be any device capable of running an application, such as application 135, for communication with a system such as system 100. The application can be an application proprietary to the system, and be provided for end users via different ways known to a person skilled in the art, for example, by downloading the application form an App Store in the mobile devices. The resources from the application could also be available via a webpage accessed through a browser, proprietary to the system or not.

The application, such as application 135, can be used by the user to interact with the system, and for example to access content stored in the extracted content database 150, provide the non-tokenized identification, have the system generate a mailbox, and receive the tokenized identification back from the server. In order to do so, the application can include a user interface via which the user can provide a non-tokenized identification, such as their mobile numbers. This user interface can be presented, for example, when the user first accessed the application and wants to associate the non-tokenized identification to the system. When the system server receives the non-tokenized identification from the application, it can perform the functions described above to associate the non-tokenized identification to a mailbox in the system and provide a tokenized identification to the user of the mobile device running the application.

Multiple forms of two-factor authentication could be used by the system to guarantee the authenticity of the data provided by the end user, or the mobile device running the application. For example, if the non-tokenized identification is a phone number, the system could send an OTP to the phone number via means external to the application, such as regular text messages or a call, to be entered by the user via the user interface in the application. In this way, the authenticity of the mobile number provided can be verified. Other types of two factor authentication are possible, for example, the system could send an interactive notification to the device being registered, so that the user can perform a certain action, such as clicking on a "confirm" link to confirm that the user is in possession of the device being registered. Such notifications could be sent to the mobile number of the device, or be associated with some other kind of device ID.

The application and system can communicate via a communication channel, such as channel 160 of FIG. 1. The communication channel can be considered secure after the mobile device has been authenticated, for example via the two-factor authentication mentioned above. The communication channel can be secured using the mobile number by transmitting a confirmation code to the mobile device from the system and receiving the confirmation code from the application by the system. For example, the system could engage in the transmission of a confirmation code in the form of a five digit number to the mobile device in an SMS message, and then engage in the receipt of that same five digit number from an API associated with the application. Once the channel is secured the system server can then communicate with the application, and transmit, for example, the tokenized identification. In the alternative or in combination a non-tokenized identification can be a credential of the secure channel (e.g., a username or password used when creating and accessing the channel). The communication channel can be secured using the credentials and an optional associated password upon the server receiving such information from a user device.

The application and the system could communicate through a dedicated data channel or the Internet as secured using the approaches disclosed above in the prior paragraph. The applications and the system could also communicate via an API, and the secure channel can be provided on the API. In those embodiments the secure channel can be secured using the non-tokenized identification, such as the mobile number of the device running the application, for example by restricting the API to only function with the mobile device having the mobile number. In these embodiments, the secure channel could also be secured using the approaches disclosed above in the prior paragraph.

The systems in accordance with specific embodiments of the invention can provide various services once a tokenized identification is provided and a mailbox has been associated with the non-tokenized identification. The services can be provided via the secure channel between the applications and the system. For example, the system can perform functions to manage the content, such as e-mails, received at the mailbox via the tokenized identification. Some of those functions can be performed, for example, by a system server, such as system server 120 of FIG. 1.

A system server, such as system server 120, can perform various functions and methods. The system server can be programmed to execute instructions stored in a non-transitory computer-readable medium. The computer-readable medium may be memory within the server or a network accessible memory, such as a shared memory of the system 100. The system server can include one or more processors to execute the instructions stored in memory. In this way, the system server can run a software for its intended purpose.

The system server could be addressable by the tokenized identification provided by the mailbox server. For example, the system server could be addressable by the mailbox address of the mailbox generated by the mailbox server. The mailbox server could receive electronic messages, such as e-mails, addressed to the tokenized identification, such as the mailbox address. The system server could read the electronic messages received in the mailbox. The system server could extract content from such messages to obtain extracted content. The extracted content could be stored in the extracted content database where it can be accessed by the application running in the mobile device. For example, the extracted content could be transmitted to the application via the secure channel between the system and the applications. The system server could behave as the database server for the extracted content database and manage requests to access content from such database. For example, the system server could instantiate a database management system (DBMS). The system server could behave as an API management server and address requests received from the applications via an API. The application running in the mobile device could then communicate directly with the database via the database server.

The extracted content can be content extracted directly from the electronic messages or derived therefrom. The data derived from the messages can be metadata obtained from processing the messages or data extracted directly from the messages but classified according to various classes. The system server could add attributes, such as a sender name, sender e-mail address, subject, username, user e-mail, domain, HTML mail content, date, mail tag, mail type, etc. to the extracted content so that the extracted content is enriched to be further processed by the system or provided to the user. By adding attributes, it can be possible to group content, filter content, and process content more easily.

The system server can include a classifier, such as classifier 125 in FIG. 1. The classifier can be a dedicated module, such as a software module or dedicated set of instructions, that classifies the content from the mailbox, such as electronic messages received, into a set of classes. The attributes of the extracted content can identify the classes in the set of classes. For example, the classifier can classify electronic messages received at the mailbox into types of messages such as promotions, password resets, confirmations, receipts, and the like.

In specific embodiments of the invention, when an e-mail arrives at a user's mailbox, the initial classifier can check for anti-spam and then the emails can be processed by custom scripts. Using machine learning and natural language processing scripts, every email can be read, decrypted, processed, stripped, chopped into different datasets, and sent to a different collection linked to specific user phone accounts. E-mails can then be archived or deleted. Additional attributes can also be added to the database. The user could access all the conversations from the database only and not from the mailbox server.

The system server could store the extracted content in a database such as extracted content database 150 of FIG. 1. The extracted content database could be part of the system server or a dedicated database. The extracted content database could be a single database or a cluster of databases, such as relational databases. The extracted content database could permit the application running on the mobile device to access at least a portion of the extracted content stored therein. The extracted content stored in the extracted content database can be stored in association with the non-tokenized and/or the tokenized identification. The portion of the extracted content accessible to the application can be the portion associated with the non-tokenized identification, such as the mobile number, of the mobile device running the application. The extracted content could be stored in the extracted content database in accordance with the set of classes defined by the classifier. The extracted content could be stored in the extracted content database in association with the attributes added to the data by the system server.

The application could access the extracted content stored in the extracted content database in various ways. For example, the application could access the extracted content database via an API. The extracted content database could be managed by or associated to an API management server, which can be the system server itself or other additional server in the system. In this way, data can be provided to the applications via such API. The API can be a secure communication channel as described before in this disclosure by restricting the API to only function with the mobile device having a verified non-tokenized identification, such as a mobile number verified via OTP.

In specific embodiment of the invention, communications between the extracted content database and the application are one-way only, from the extracted content database to the applications. In specific embodiments of the invention, the application has limited access to the extracted content database, being able to send limited requests, such as limited SQL queries. For example, the application may be able to send queries to obtain information from the database, but not to update or otherwise modify the content in the database. In the examples where the tokenized identification is the mailbox address, the tokenized identification can be never associated with any electronic message sent from the application using simple mail transfer protocol (SMTP) or post office protocol (POP). In other words, in those embodiments the application can receive content from the extracted content database and system server but cannot send e-mails back to the senders.

In specific embodiments of the invention, the system could include a database of registered senders, such as registered senders database 140 of FIG. 1. The registered senders database could be part of the system server or a dedicated database. The registered senders database could be a single database or a cluster of databases, such as relational databases. The registered senders database could be a different portion of the same database as the extracted content database. The registered senders database can be used to keep a record of registered senders. The term "sender" is used herein to refer to any sender from which the system receives electronic messages for the end users of the application. The term "registered sender" is used herein to refer to senders that are registered into the system.

Senders can become registered in various ways. For example, senders such as retailers can undergo a registration process with an administrator of the system via which they prove the authenticity of the e-mails addresses they use to communicate with their customers, and therefore become registered senders. As another example, certain senders can establish a partnership with the system and therefore be considered registered senders through their relationship with the administrators of the system. In specific embodiments of the invention, the end-users of the application can select the senders that they wish to have messages processed from. Those senders can then be considered the registered senders for the given user. In other specific embodiments of the invention, the database of registered senders is not editable using the application.

In specific embodiments of the invention, the database of registered senders can be used by the system server as a whitelist. In those embodiments, the system server could be programmed to only process messages from senders included in the database of registered senders. The system server could be programed to execute a dedicated set of instructions for emails from senders that are not on the whitelist. The system server could be programmed to delete received electronic mail from any sender that is not on the whitelist. The system server could be programmed to quarantine received electronic mail from any sender that is not on the whitelist. The system server could be programmed to send notifications to the unregistered senders that the message could not be received by the recipient, or an invitation to register with the system. The system server can be programmed to inspect the domains from which the e-mails come from and block certain e-mails based on the domain. The not-allowed domains can be determined at the system's discretion and according to various parameters. For example, the system may be programmed to determine whether the e-mails come from a retailer or not, and only process e-mails from retailers.

The registered senders database can be used to associate multiple sender addresses per registered sender. For example, if a given sender has different e-mail addresses for different topics such as promotions, customer service, refunds, etc., all those e-mail addresses could be associated with the same sender in the registered senders database. The association can be performed during the registration process, by the system server while processing the messages or by any other server working in combination with the registered senders database.

The electronic messages received in the mailbox and processed by the system server can have sender address attributes, which can include the multiple sender addresses per registered sender. The system server can use the database of registered senders to discretize the extracted content on a per registered sender basis. For example, all e-mails from a same sender could be associated together as belonging to the same sender regardless of the differences in the e-mail addresses of the e-mails received.

Figure 2:
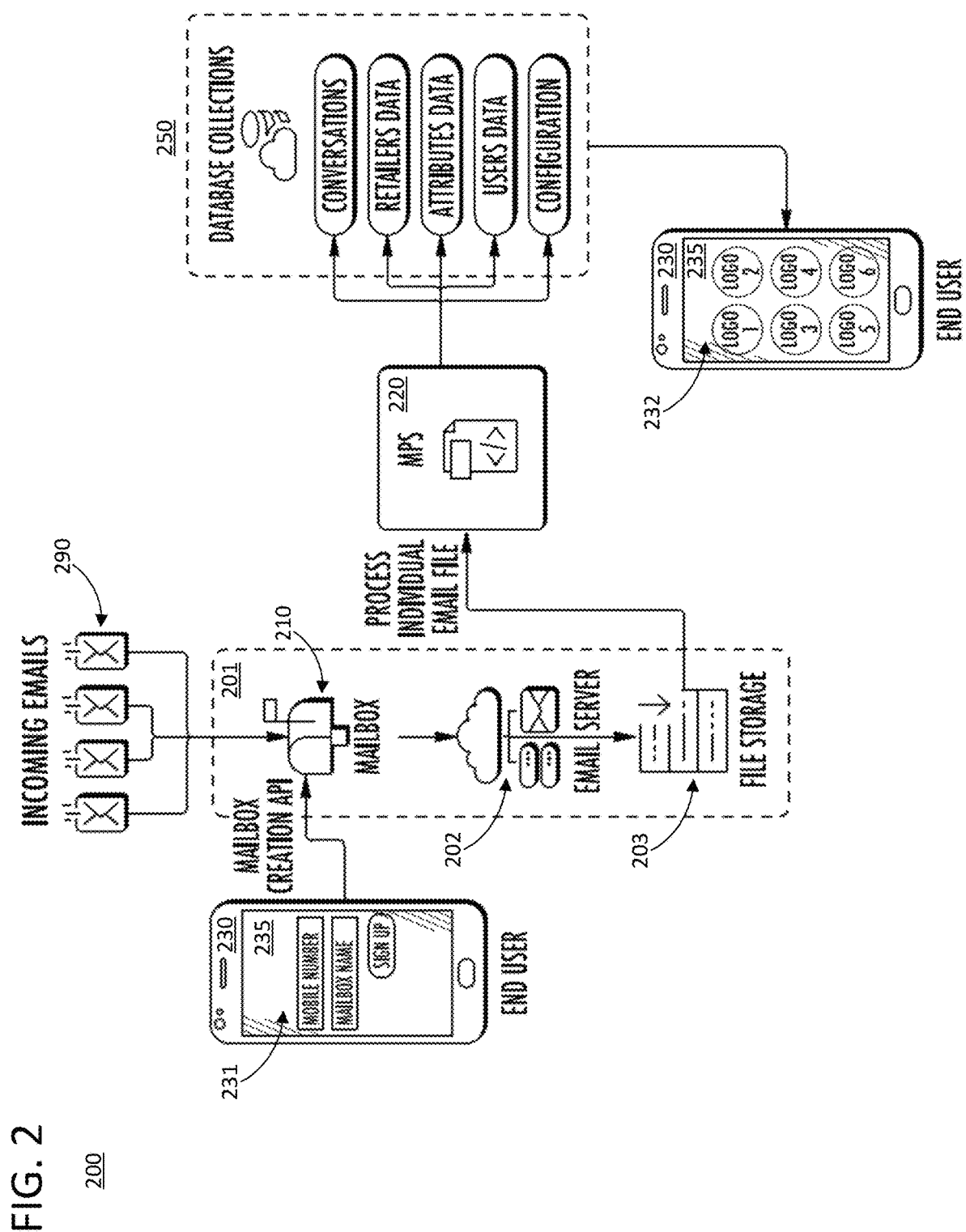
FIG. 2 includes an example of the operation of a system in accordance with specific embodiments of the invention disclosed herein.

FIG. 2 includes an example of the operation of a system in accordance with specific embodiments of the present invention. The system in FIG. 2 can include elements which are the same as, or similar to, the elements described with reference to system 100 in FIG. 1. FIG. 2 illustrates two different user interfaces 231 and 232 being presented in a mobile device 230 running an application 235. Mobile device 230 and application 235 can be the same as or similar to mobile device 130 and application 135 described above with reference to FIG. 1. The two different user interfaces 231 and 232 can be presented in different moments in time as the end-user of the mobile device 230 interacts with the application and as the system 200 executes instructions and perform method steps. User interfaces 231 and 232 are illustrated for explicative proposes only. The application can include multiple other user interfaces as programmed by the application developer and the layout of such interfaces is not limited the layout represented in the figures.

The first user interface 231 can be provided when a user first accessed the application. As illustrated, interface 231 can allow the user to enter a phone number. The system could, after receiving the phone number from the application, perform an optional verification step to confirm that the number is not yet associated with the system. As explained before, any other type of non-tokenized identification can be provided at this point.

Interface 231 also allows the user to enter a mailbox name. Although the example of a mailbox name is being used, the application could provide the user with the opportunity to select a username, user ID, nickname, or other name to be referenced by the system. In embodiments in which the user is able to select a mailbox name or other name, an additional step can be carried out by the system to verify that the mailbox name is available. If the mailbox name is available, the system continues to verify the authenticity of the phone number or other non-tokenized identification provided. If the authenticity is verified, a mailbox is crated with the name entered by the user. The mailbox name can be processed for the system and its format changed in accordance with the system requirements. For example, the system could use the mailbox name entered by the user as a prefix for an e-mail and add the domain of the system afterwards. As another example, the system could use the mailbox name entered by the user as part of a code or ID generated by the system for the user. In this way, users of the system can generate their own system ID (which can be the tokenized identification itself or part of it), if it is available.

After the user has provided the mobile number and mailbox name to the application, and the systems verifies that the mailbox name is available, the system can proceed to verify the authenticity of the mobile number provided as explained before with reference to FIG. 1. For example, a two-factor authentication procedure can be carried out and the mobile number verified. During the initial set up, the user can also be required to provide answers to selected secret questions, that can be used for future two-factor authentication.

FIG. 2 also illustrates a server 201. The server 201 can be a single server or a cluster of servers and can run for example a mailbox server 210. The mailbox server 210 can be the same as or similar to mailbox server 110 described with reference to FIG. 1. As illustrated, a mailbox creation API can be established between the application 235 running on mobile device 230 and the mailbox server 210 so that a mailbox is created. The API can function as a communication channel between the application and the mailbox server and can be administrated via an API server. In specific embodiments of the invention, the application cannot communicate with the mailbox server and the creation of the mailbox is administrated by a system server or other means.

Server 201 could also run an e-mail server 202 and a file storage service 203. The e-mail server and file storage server can be provided to manage and store the e-mails 290 received at the mailbox. In specific embodiments of the invention, the end-user does not have access to the e-mails. The system processes the e-mails and provides content extracted from the e-mails to the application, but the e-mails themselves are stored or deleted.

FIG. 2 also illustrates a system server 220. The system server 220 can be the same as or similar to system server 120 described with reference to FIG. 1. System server 220 can generate a tokenized identification for the mobile number as explained before in this disclosure. The tokenized identification can be linked to the mobile number. In specific embodiments of the invention, the tokenized identification can also be linked to a device ID. The tokenized identification, the mobile number (or other non-tokenized identification), and the device ID can be stored in a database of the system so that when the application is launched the data can be made accessible to the user via the application. If the device ID is provided, the system could recognize the device launching the application and make the data associated to that device available to the application. The mailbox will then be associated to the phone number and mailbox name entered via the application 235, and the mobile ID. The mailbox can be created after successful registration/authentication of the phone number. In specific embodiments of the invention, the tokenization can be performed by the server 201 via the mailbox creation API.

The system server 220 can process individual e-mail files from the file storage, extract content from the e-mail file, add attributes and push the values to a database. The system server 220 can further classify and tag the e-mail into different categories and write the content into a database using, for example, machine learning. Different rules can be set for the system server. The rules can be set by a system administrator or selected by the user by interacting with the application. For example, the system server can be programmed to ignore a certain kind of e-mail, for example non-retailers emails. The system server can also be programed to execute a certain set of instructions for a certain kind of e-mails, such as e-mails including coupons or promotions.

FIG. 2 also illustrates a database 250. Database 250 can be the same as or similar to extracted content database 150 described with reference to FIG. 1. As illustrated, the extracted data can be pushed into the database 250 by system server 220. The data can be classified in multiple classes such as conversations (e.g., stripped mail content that is tagged and labeled and stored in database for every mail received), retailers data (e.g., retailer logo, name, subscription address, unsubscription links, etc. stored in the database while processing each conversation/email received), attributes data (e.g. processed and proprietary content that the process can write for each user into the database for every retailer based on the conversation/email received), users data (e.g. specific user details captured during the registration process like tokenized identification, OTP Verified Status, Phone number, Device ID, answers to secret questions etc.), configuration (e.g. interests/categories chosen by user during registration process related to consumer retail industries, secret questions and answers that can be used when a user wishes to change his phone number, etc. that can be pre-populated in the database), etc. This classification can be possible due to the processing in the system server in which e-mails are read and the contents are extracted and classified. The classification process can be aided by artificial intelligence and machine learning algorithms so that the server becomes more efficient at classifying the extracted content.

The extracted content, classified and stored in the database, can be made available to the application running on mobile device 230. User interface 232 illustrates an example of how this data can be presented. The application can present a clean and user-friendly interface with a clear representation of different sellers from which the user of the mobile device has received e-mails via the tokenized identification generated by the system. The different sellers can be represented by their names or logos so that the user can easily identify them. The data in the database can then be made available to the application organized and grouped by sellers. The data can be provided to the application via an API, as explained before in this disclosure.

With the process described with reference to FIG. 1 and FIG. 2, a user of the system can easily and securely visualize information that could otherwise be lost among other e-mails in a conventional e-mail application. Users would also be willing to provide their tokenized identification to sellers because of the convenience of having the e-mail processed and the content extracted and organized, and because their personal contact information is never exposed. This could be advantageous from the seller perspective as well in that the user could visualize information from the e-mails that could otherwise get lost among other e-mails.

Figure 3:
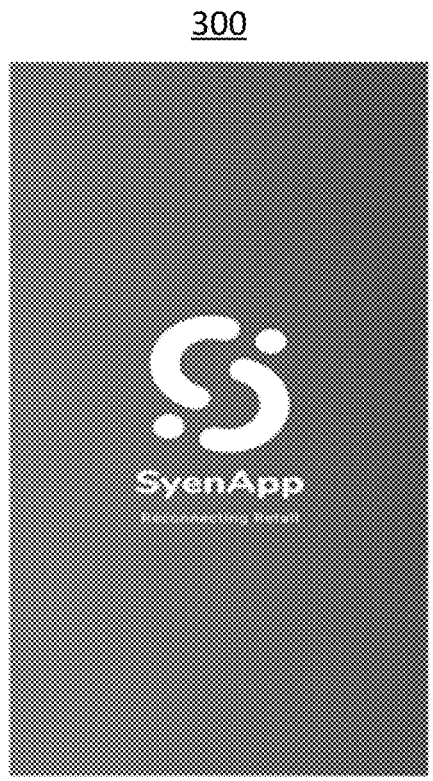
FIG. 3 includes screenshots of different user interfaces provided by an application in accordance with specific embodiments of the invention disclosed herein.
Figure 3:
Figure 3:
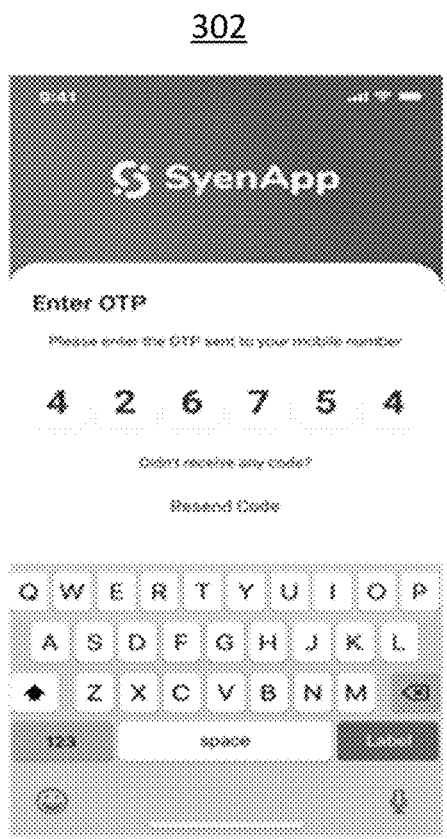
Figure 3:

FIG. 3 includes screen shots of different user interfaces provided by an application in accordance with specific embodiments of the invention disclosed herein. Interface 300 or a similar one can be provided when the application is launching. The interface could provide a logo for the system and other informative content. Interface 301 is an example of the interface 231 described with reference to FIG. 2 via which the user can enter the mobile number. In the example of FIG. 2, the application provided the opportunity for the user to enter a desired mailbox name. In the example of FIG. 3, the application provides the user with the opportunity to claim an application or system ID. As illustrated, the application ID provided by the user is used as the username followed by the system's domain name after the at (@) to form an e-mail address. In this example, the tokenized identification would be the e-mail address, and it is generated using the, and associated to the, mobile number. Interface 302 is an example of an interface provided to perform the two-factor authentication mentioned herein. In this case, the interface provides the user with an opportunity to enter an OTP that may have been received by the user via other channels such as through an SMS message. Interface 303 is an example of an interface that can be provided by the application when the registration is completed. In this example the interface allows the user to select any three categories that the user may be interested in, which can be related to retail industries. These categories, along with the secret questions mentioned before, can be prepopulated in the database so that the user has a definite number of options to choose from.

Figure 4:
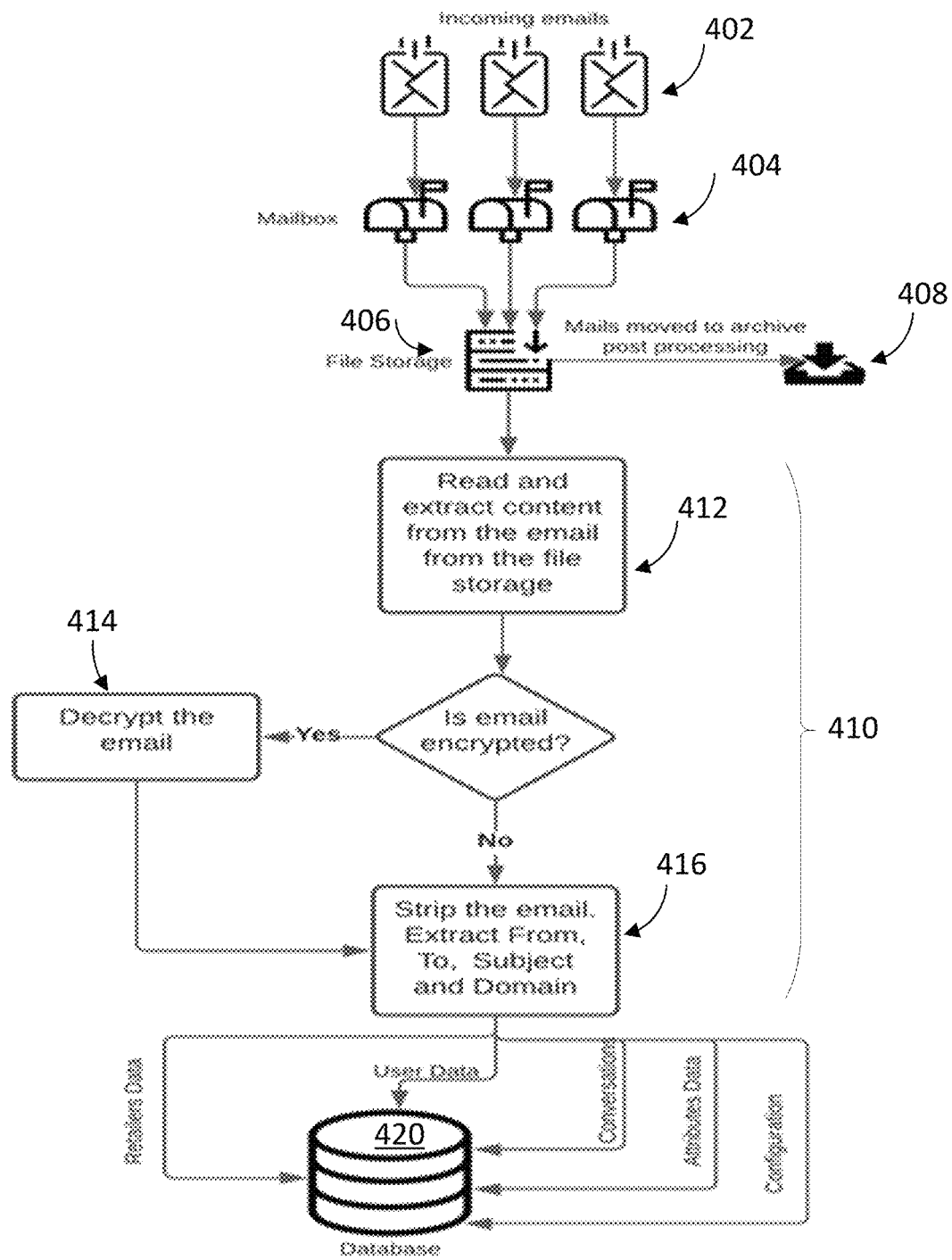
FIG. 4 includes a block diagram of the system and a flowchart for a set of methods in accordance with specific embodiments of the invention disclosed herein.

FIG. 4 includes a block diagram of the system and a flowchart for a set of methods in accordance with specific embodiments of the invention disclosed herein. The block diagram illustrates a set of mailboxes 404 for receiving a set of e-mails 402. The mailboxes in the set of mailboxes 404 could have been created via a process as described above in this disclosure, by using a mailbox server, and be associated with different mobile numbers and addressable by different tokenized identifications. The e-mails can be passed on to a file storage 406 and eventually moved to archive 408, for example after the e-mails are processed.

The flow chart 410 describe steps that can be performed by the system server. A first step 412 involves reading and extracting content from emails from the file storage. If the e-mail is encrypted, the method can include a step 414 of decrypting the e-mail before proceeding to step 416 of stripping the e-mail and extract content such as information from the "from" and "to" fields, the subject, the domain, etc. If the email is not encrypted the method can proceed directly from step 412 to step 416. The data could then be classified and stored in a database 420 in accordance with such classification. In the illustrated case, the data stored in the database can be related to retailers, to the user, to conversations (stripped e-mail content tagged and labeled), to attributes data, configuration, etc.

Figure 5:
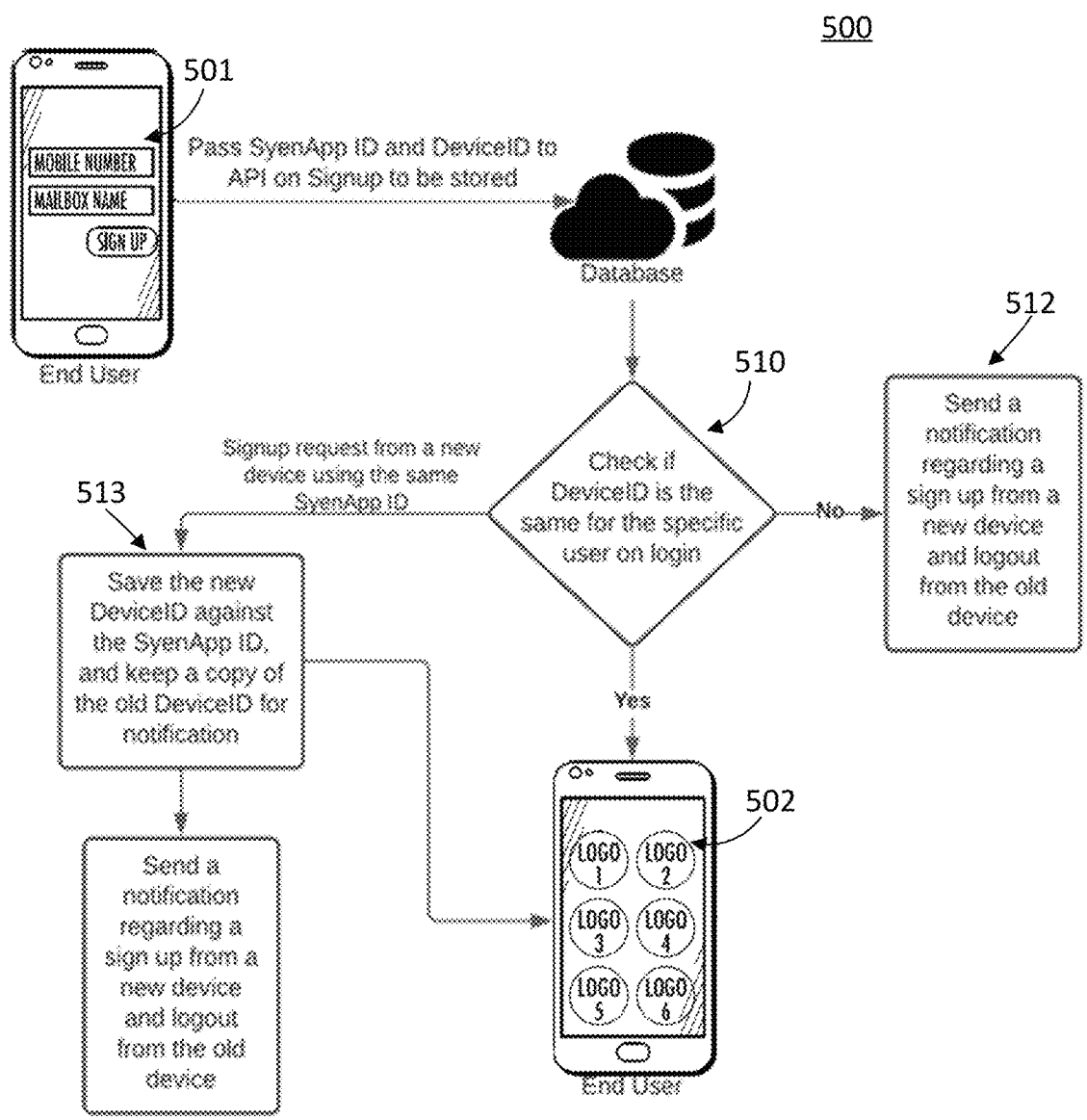
FIG. 5 includes a flow chart for a set of methods for accessing the data stored in the database and for updating the device associated with the system in accordance with specific embodiments of the invention disclosed herein.

FIG. 5 includes a flow chart 500 for a set of methods for accessing the data stored in the database and for updating the device associated with the system. As a first step, the user can provide their tokenized identification along with a device ID. This information can be provided via a user interface 501 on the application running on the mobile device, which can communicate with the system via an API. In a next step 510, the system checks if the device ID provided during the login is the same stored in association with the specific user/mobile number. If the information matches, the application can present the user interface 502 and the user's stored data can be made available to the user via the application. If the information does not match, a notification can be sent to the previous device associated with the stored device ID to announce the sign in from a new device and optionally logging out from the application in the previous device in a step 512. When there is a sign-up request from a new device using the same tokenized identification, the new device ID can be saved in association with the tokenized identification while the previous device ID can be kept for other purposes such as notifications in a step 513.

When the device ID is used for the registration process along with the non-tokenized identification, the device ID could then be linked to the user and mailbox. Multiple options could be possible for the user to change the device associated with the mailbox. For example, if a user tries to install the application on a different/new device like a phone or a tablet, the application could still welcome the user with an OTP to the phone number registered and then replace the current "device ID" with the new "device ID." The system could unregister and disconnect the previous device allowing only one device to access the data at a time or not. Any other kind of two-factor authentication could be possible in order to confirm that the user is the owner of the non-tokenized identification associated with the mailbox.

As another example of the above, if a user wishes to change their phone number but use the same device, the user could be asked to answer a personal secret questions that may have been set up during the registration process to ensure that the user attempting to change the phone number is the owner of the mailbox. Answering the questions could allow a user to access the account and data associated to the tokenized identification while the device ID remains the same. As another example, if a user wishes to change both the phone number and the device registered with the system, the user may be asked to answer personal secret questions setup during the registration process. Answering the questions could allow the user to access the account and data associated to the tokenized identification, and it could also update the database with the new "device ID."

Figure 6:
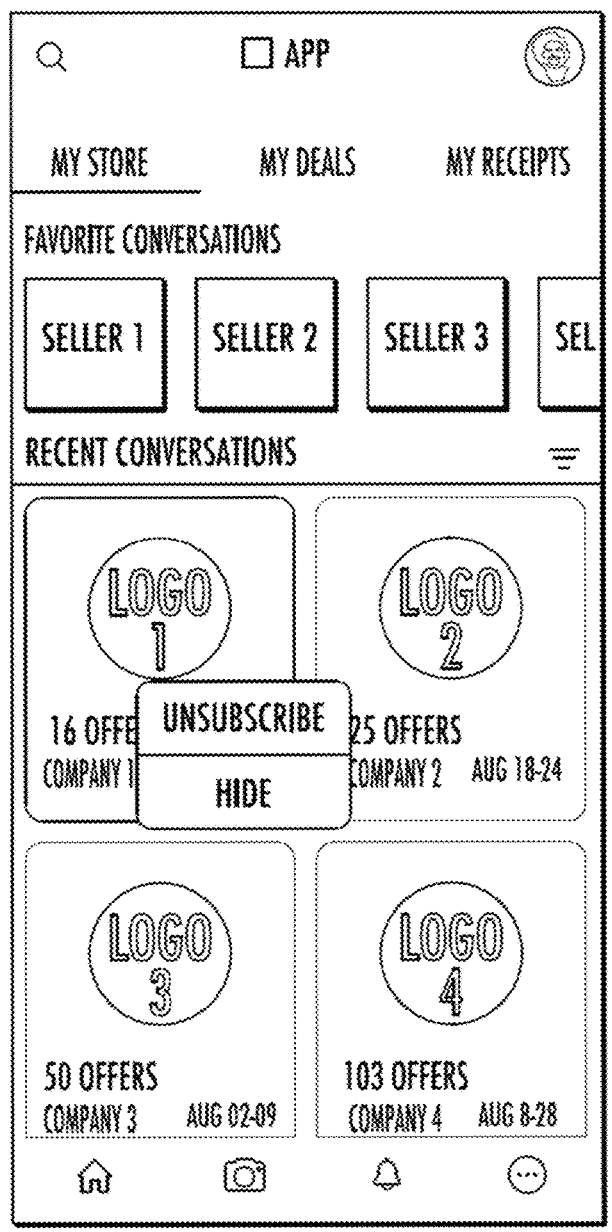
FIG. 6 includes an example of a feature provided by the application in accordance with specific embodiments of the invention disclosed herein.
Figure 6:
Figure 7:
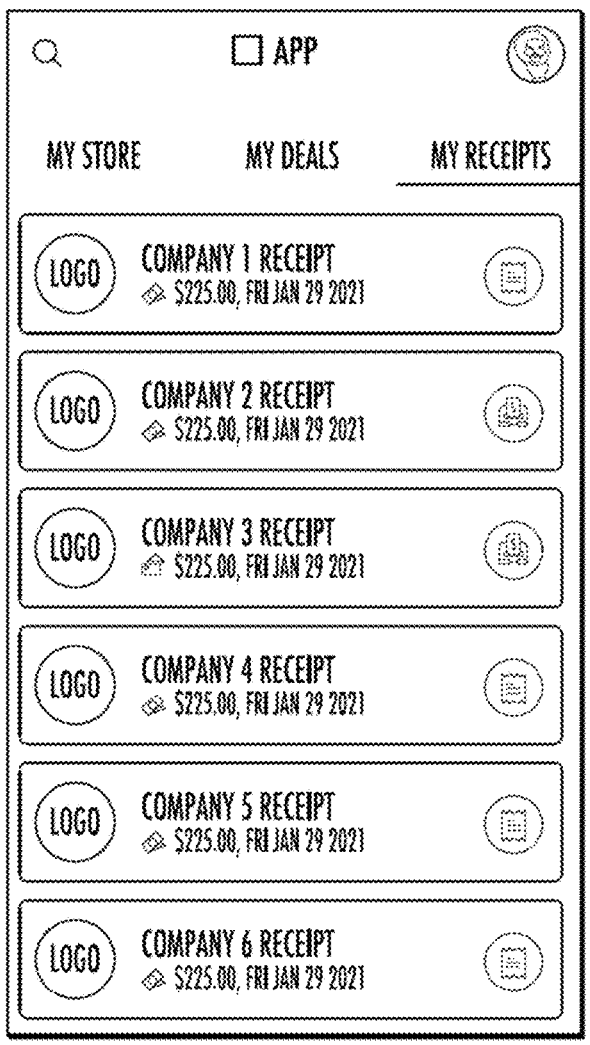
FIG. 7 includes an example of a second feature provided by the application in accordance with specific embodiments of the invention disclosed herein.
Figure 7:
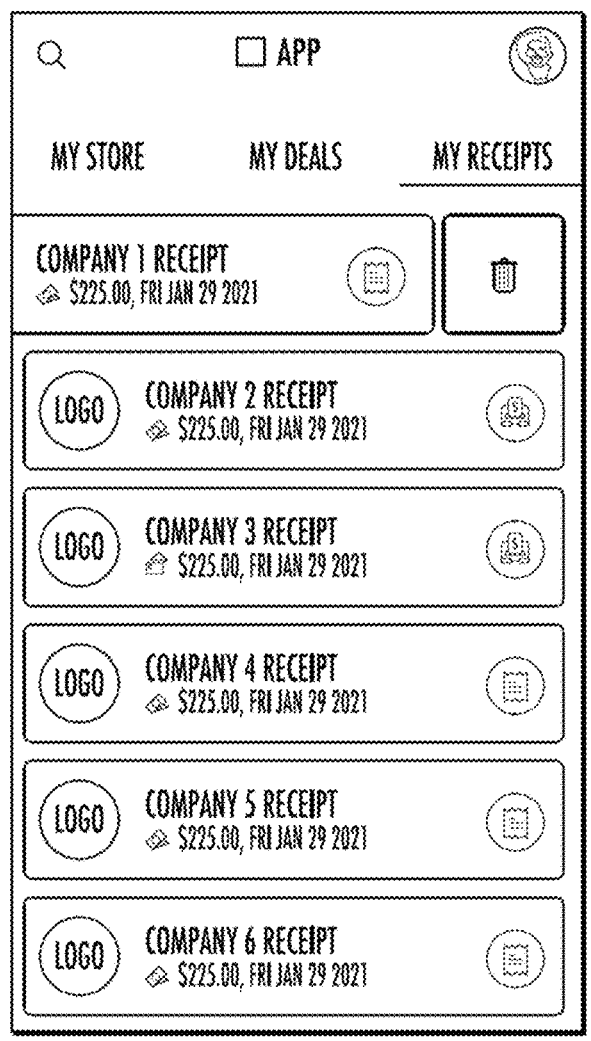
Figure 8:
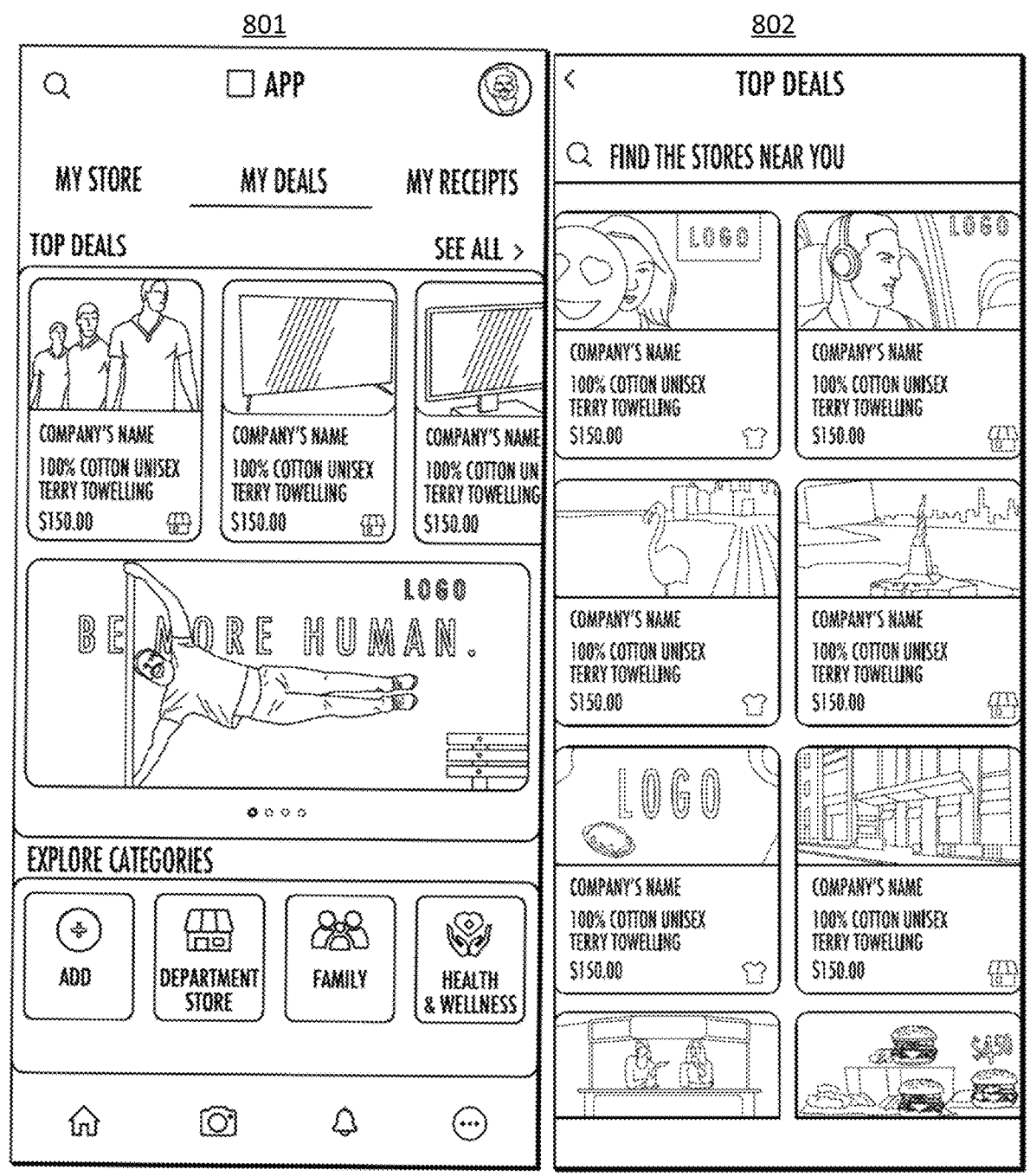
FIG. 8 includes an example of a third feature provided by the application in accordance with specific embodiments of the invention disclosed herein.

FIGS. 6-8 include examples of different features that the application can provide by using the data from the database. FIG. 6 illustrates examples of user interfaces 601 and 602 for a "My Store" feature of the application. This screen can be provided so that the user can view all the conversations received from different retailers through different signups and transactions with the retailers, for example. Conversations can be grouped based on retailers as explained before and be presented like one click tiles, as illustrated in interface 601. The user can select the desired tile, and conversations can be viewed in tabs that can segregate different types of conversations like coupons, transactions, promotions etc., as illustrated in interface 602. This can be all user generated content sent to the user by the retailers/merchants and processed by the system. In this way, the user can have the conversations organized in a user-friendly interface that allows the user to navigate through the data in the database by intuitive paths such as organized by retailers, classes, etc.

FIG. 7 illustrates user interfaces 701 and 702 for a "My Receipts" feature of the application. This screen can be provided so that a user can see all the e-receipts received for the tokenized identification. In specific embodiments of the invention the user can additionally be able to upload content to the application, such as paper receipts from a seller. In those embodiments, the user can be able to view all the uploads of paper receipts from the "My Receipts" screen as well. The interface can show the summary of each receipt like the transaction date, payment type (cash/credit), amount of transaction. A user can delete a receipt anytime. This is all user generated content sent to the user by the retailers/merchants. In this way, the information received via the tokenized identification and processed by the system can show up in numerous different ways, as classifies and organized by the system, for the user to visualize and manage the content.

FIG. 8 illustrates examples of user interfaces 801 and 802 for a "My Deals" feature of the application. This screen can be provided so that users can get personalized and curated promotions and individual product recommendations based on their personal areas of interest selected during the initial registration process with the application. The user can interact with the interface and select deals. If the user chooses to purchase or redeem any of the offers, the application could be programmed to allow the user to do in-app purchases. The purchases can be performed via a native browser loaded that will result in further conversations from retailers. The purchases can be performed via standard browser or API's to sellers' servers.

A system in accordance with specific embodiments of the present invention as described in this disclosure can provide an intelligent platform for consumers and retailers. The cluttered emails that arrive to a user inbox from various retailers can be handled more easily and efficiently. The system allows for the creation of a tokenized identification, such as an email address, that can be used to receive all the signups, promotions, coupons, order confirmations and receipts from retailers instead of real personal contact information. Because the system receives and processes the e-mails, grouping and classifying the content according to various rules, using the application for the system allows for a clear visualization of the information being received, such as deals from marketplace, while keeping personal/work email address, safe and clutter free. It makes it a one system and channel for consumers to receive communication from brands and all content in one place without having to clutter their personal email channels and the need to download too many shopping apps and coupon apps.

In specific embodiments of the invention, the application allows the user to get all promotions from stores, marketplace deals, paper and electronic receipts in one place. The user can personalize his/her interests, so that the user can control and see only what the user wants to see. Users of this application and system can safeguard their personal email address, phone number, or other personal identification, by not using them with the retailer signups.

Specific embodiments of the invention result in a system with all communication from brands, and content from advertisers in one place, while having a greater control and privacy for the consumers, resulting in a consumer-controlled marketing and shopping platform.

The application of specific embodiments of the invention can be different than conventional e-mail applications in that conventional e-mail application usually present the emails received as standalone conversations or based on dates, and the user directly access the e-mails from their mailbox, whereas the system and application of specific embodiment of the invention allows that the emails received can be viewed based on retailers that are shown, for example, as one touch tiles. As illustrated in the figures, a retailers list can be shown first, for example for brand recognition, and on click of retailer tile, the user can view all the emails from the specific retailer sent to that user or other data extracted from the e-mails instead of the e-mails themselves. The application can show the conversations grouped by each retailer and each conversation can be tagged by the system using machine learning and natural language processing techniques. These tagged emails can be seen in separate tabs within the retailer section view. Therefore, the user can see coupons and transaction emails (order confirmation, order pickup, etc.) in separate organized tabs.

In specific embodiment of the invention, the application allows the user to receive conversations but not necessarily to communicate back. In those embodiments, a user would not reply or forward an email received. The user could or could not have direct access to the mails. The user could access e-mails through the application or access only the content extracted from the e-mails but not the e-mails themselves. E-mails received in the mailbox can be no longer stored in the email server but are stripped, added more attributes to the dataset and stored in a separate database, such as extracted content database. User will be given an option to write/compose a message to any specific sender through the application, but it's not linked with any email/conversation history.

As described before in this disclosure, to access these conversations received through the system and application, the phone number associated with the mailbox can be authenticated by the database and hence it ensures only that phone number can access the mailbox. As such, in specific embodiments of the invention, there is no password authentication for each of the mailbox/tokenized identification. Each tokenized identification is associated with a unique non-tokenized identification, such as a phone number.

The systems and methods in accordance with embodiments of the present invention can connect the retailers and consumers like never before, giving consumers peace of mind and a better Return on Investment (ROI) to retailers because the user are more likely to visualize and use the information provided that otherwise could be lost among other e-mails. In specific embodiments of the invention, the application does not allow the composing of mails or forwarding of mails. In specific embodiments of the invention, no direct access to the mail is allowed. In specific embodiments of the invention, the user cannot access the conversations either on web or desktop or from any other phone number. In specific embodiments of the invention, the system processes the received mail and pushes the content into database so that the user can read stripped emails and/or extracted content only through the application from database. The user could be provided with additional options to configure the user interface and information being presented, such as hiding a retailer if he does not want to see the conversations from a particular retailer.

Users can safeguard their personal email and other contact information by not disclosing them to retailers. Users can have all their promotions, coupons, receipts etc. from all retailers in the application thus it can become a one stop shop for consumer experience. Users can easily recognize the brand and search through all kinds of conversations easily either the coupons, receipts, etc. Users can easily hide/show conversations from retailers with a one-click tile. User can see personalized and recommended products for purchase based on the interests they choose.

Figure 9:
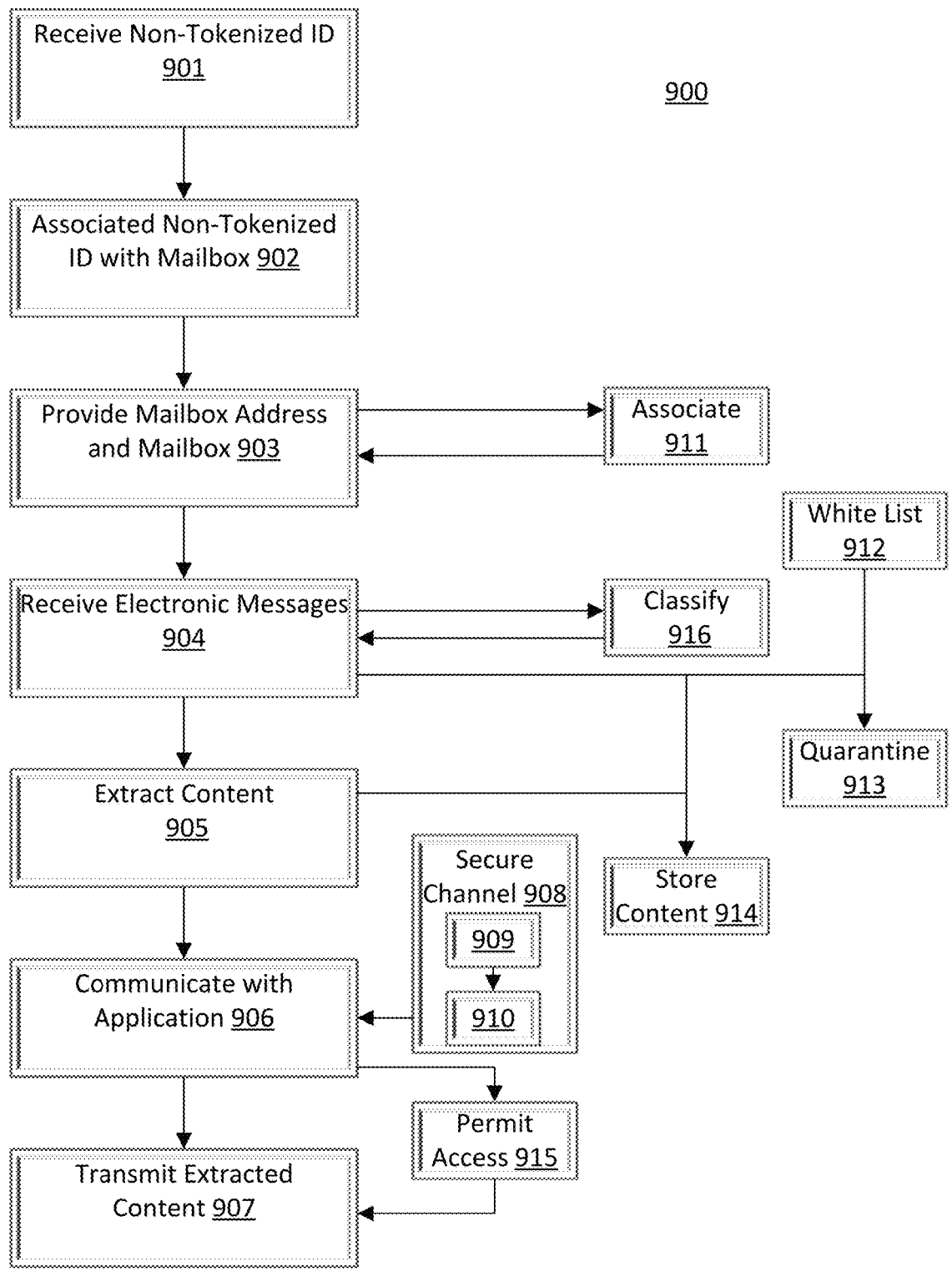
FIG. 9 includes a flow chart for a set of methods that can be executed by a computerized system in accordance with specific embodiments of the invention disclosed herein.

FIG. 9 includes a flow chart 900 for a set of methods that can be executed by a computerized system in accordance with specific embodiments of the invention disclosed herein. The computerized system can be system 100 from FIG. 1 with individual steps conducted by individual components of system 100 executing stored instructions. The instructions can be stored in one or more non-transitory computer-readable media accessible to the components of system 100. The flow chart beings with a step 901 of receiving a non-tokenized identifier. The non-tokenized identifier could be a mobile number of a mobile device. The step could be conducted by a system server such as system server 120. The flow chart continues with a step 902 of associating the non-tokenized identifier with a mailbox. For example, the step could include associating a mailbox with a mobile number. The step could be conducted by a system server such as system server 120. The flow chart continues with a step 903 of providing a mailbox address for the mailbox in exchange for the non-tokenized identifier. For example, the step could include exchanging the mailbox address for a mobile number. The step could be conducted by a system server such as system server 120. The step could also involve providing the mailbox. This aspect of the step could be conducted by a mailbox server such as mailbox server 110 and involve allowing the mailbox to receive electronic messages sent to the mailbox address.

Flow chart 900 continues with a step 904 of receiving, using a mailbox server, a set of electronic messages addressed to the mailbox address. The mailbox server could be mailbox server 110. Flow chart 900 continues with a step 905 of extracting, using a system server, content from the set of electronic messages to obtain extracted content. The system server could be system server 120. The extracted content could be metadata and message data from the electronic messages. The extracted content could include content necessary to organize and present the content of the electronic messages to users of the system as described above.

Flow chart 900 continues with a step 906 of communicating, using a secure channel, with an application on a device. The device can be a mobile device such as mobile device 130. The channel can be secured by the non-tokenized identifier or use the non-tokenized identifier as a credential. For example, the secure channel can be secured using a mobile number. The mobile number can be the mobile number of the aforementioned mobile device. Communicating with the application using the secure channel can be preceded by forming the secure channel such as in a step 908. Furthermore, communicating with the application can occur before receiving the electronic messages in step 904 or before providing the mailbox address in step 903. In these embodiments, the secure channel could be used to setup and initialize the application and account for the user.

The secure channel can take on various forms and be secured in various ways. The secure channel can be provided on an applications programming interface between an application and the computerized system. For example, the applications programming interface could be between application 135 and system 100. The secure channel could be channel 160 after being secured. The secured channel could be secured using the mobile number by restricting the applications programming interface to only function with the mobile device having the mobile number. In specific embodiments of the invention, the secure channel is secured using a mobile number by a step 909 of transmitting a confirmation code to the mobile device from the system and a step 910 of receiving the confirmation code from the application by the system.

The flow chart continues with a step 907 of transmitting, using a system server, the extracted content to an application via a secure channel. The system server could be system server 120, the application could be application 135, and the secure channel could be channel 160 after it is secured. The step can be preceded by a step 915 of permitting, using an extracted content database, the application to accesses a portion of the extracted content. The portion of the extracted content could be a portion associated with a non-tokenized identifier for a particular user. For example, the portion could be associated with a mobile number of a user. The extracted content database could be extracted content database 150. The permitting of the application to access a portion of the extracted content database could be conducted based on an association between a given user, associated with the application, to access extracted content which was extracted from electronic messages sent to the mailbox associated with that given user. However, in alternative embodiments, the system could provide the user with extracted content as extracted from messages received by other mailboxes, where the data has been appropriately anonymized through the extraction, to provide the user with additional useful data such as alternative deals that the user might not be aware of from their own feed of electronic messages.

Flow chart 900 include an optional step 911 of associating multiple sender addresses per each registered sender in a set of registered senders in a database of registered senders. The step could be conducted by a system server in combination with a registered senders database. The system server could be system server 120 and the registered senders database could be registered senders database 140. The step would enable the system to provide additional flexibility to the registered senders as they may have multiple email addresses they use to reach out to users of the system. The set of electronic messages that are received in step 904 could have sender address attributes which include the multiple sender addresses per registered sender. A mailbox server could use the database of registered senders to discretize the extracted content, extracted in step 905, on a per registered sender basis. The mailbox server could be mailbox server 110.

Flow chart 900 includes a step 914 of storing, using a system server, the extracted content in an extracted content database. The extracted content could be stored in association with a non-tokenized identifier for a user who is in turn associated with the mailbox from which the content was extracted. For example, the extracted content could be stored in association with a mobile number that was provided in exchange for a mailbox address of the mailbox. The extracted content could be extracted in a step 905.

Flow chart 900 includes a step 916 of classifying, using a classifier on a system server, the electronic messages in the set of electronic messages into a set of classes. The system server could be system server 120. The classifier could be a trained machine intelligence system designed to categorize electronic messages into different classes such as coupons, deal offers, receipts, shipping confirmations, and various other kinds of emails. The classes could also categorize the type of sender and other aspects of the emails. An attribute of the extracted content in the extracted content database could identify a class in the set of classes such that the product of the classifier was available to systems with access to the external content database. The external content database could be extracted content database 150.

Flow chart 900 includes an optional step 912 of whitelisting, using a system server, a database of registered users. The system server could be system server 120. The database of registered users could be registered senders database 140. The flow chart also includes a step 913 of one of quarantining and deleting received electronic mail from any sender that is not whitelisted. The step could be conducted after the whitelist was provided in step 912 and after receiving the electronic messages in step 904. The quarantining and deleting could be conducted by the mailbox server 110, by the system server 120, or by the two servers operating in combination.

Figure 10:
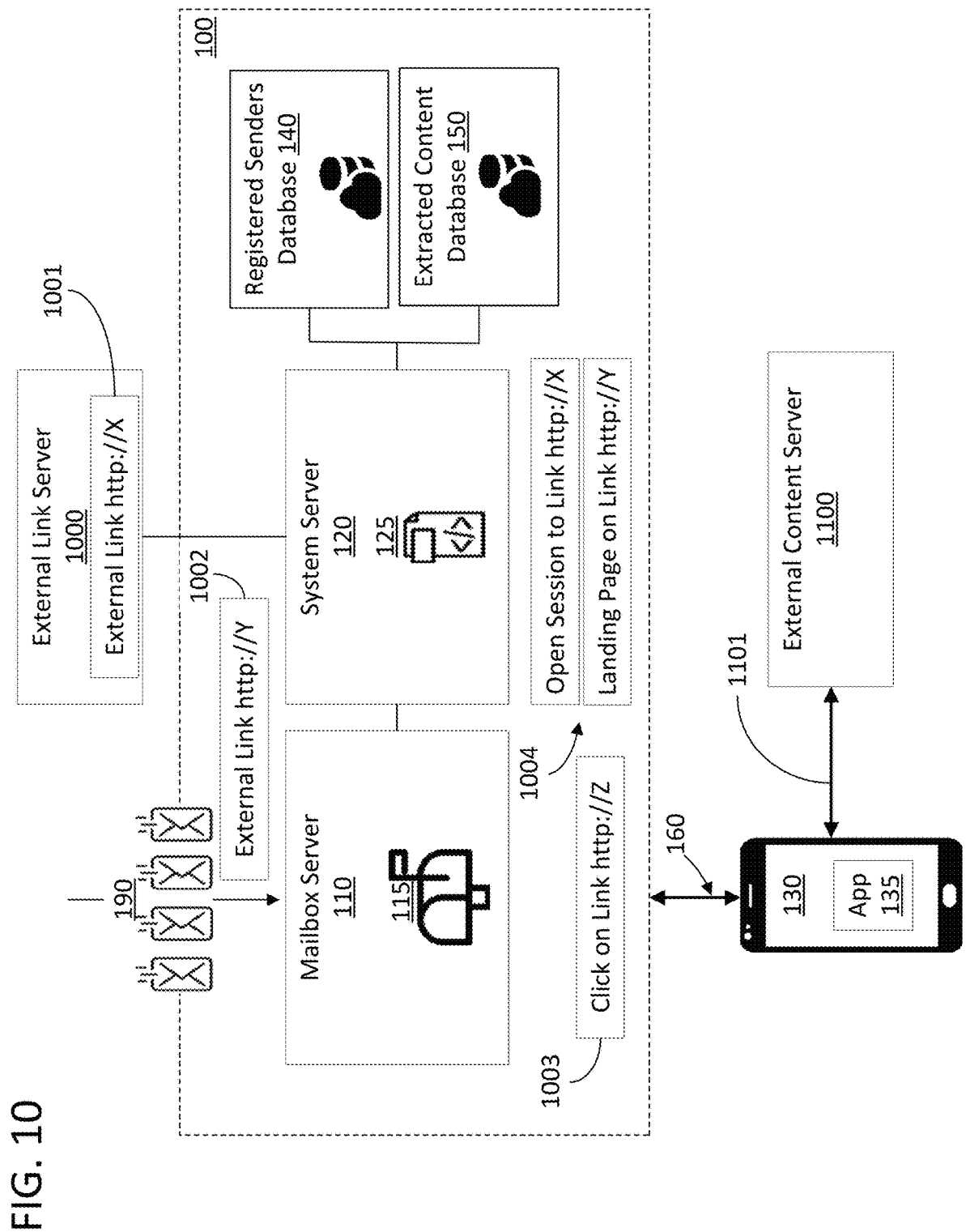
FIG. 10 includes a block diagram of the system of FIG. 1 interoperating with an external link server in accordance with specific embodiments of the invention disclosed herein.

FIG. 10 includes a block diagram of the system of FIG. 1 interoperating with an external link server 1000 in accordance with specific embodiments of the invention disclosed herein. As such, FIG. 10 illustrates some of the functionality that is enabled by the systems disclosed herein. The external link server 1000 can be a server that maintains lists of links that subscriber content partners are incentivized to distribute through their content channels. The administrator of system 100 could be one such content partner. The list of links could be associated with the provisioners of certain goods and services. The incentive for distributing the links could be an amount paid per click on the links, a percentage of sales consummated through a session that was initiated via the link, and various other incentives. In the case of system 100, the content generated by the content partner is in the form of the extraction of content from incoming electronic mail, as well any advertised/promotional content, and the value-added presentation of that content, or derivatives thereof, to the users of the system. Therefore, the administrator of system 100 can integrate the links available from external link server 1000 into said content in order to obtain the incentives offered for doing so.

In the example of FIG. 10, external link server 1000 includes an external link X 1001. The external link can be associated with a potential registered sender of system 100 or a currently registered sender. In this example, the association is such that the registered sender is the ultimate source of the incentive for diffusing external link X 1001. The links can be designed such that they are unique to specific entities that are incentivize the diffusion of the links. The links can be obtained by system 100 and stored for later use as described below. Furthermore, as system 100 receives electronic messages from the registered sender, the incoming electronic messages can include links such as external link Y 1002. These links can also be obtained by system 100 and be stored for later use as described below. The external links received in the incoming messages can be associated with additional commercial offerings of the registered sender, or be associated with other purposes such as facilitating access to an order history, an order status, an account management system, etc. As the external links, such as external link Y 1002 are received in electronic messages the system 100 can, as described above, process and store the links in extracted content database 150. The content can then be provided to a user such as through application 135.

In specific embodiments of the invention, the links presented to the users via a channel such as application 135 can, as they represent links embedded into the content produced by the administrator of system 100, include links such as external link X 1001. However, in order to prevent the user interface of the application from being cluttered with unnecessary information, the links can be embedded within alternative links for presentation on the application 135. This embedding can be conducted by the system server 120 in the generation of extracted content for extracted content database 150. In the example of FIG. 10, the embedding involves the creation of a new link in the form of link Z 1003. The link can then be sent to the mobile device. As the interface between the system 100 and application 135 can be a proprietary applications programming interface, the link does not need to be an external http:// link and the figure is only an example in this regard. Regardless, link Z is presented by system 100 in such a way as to include the original semiotics of external link Y 1002. For example, the link can be triggered by clicking on the same text, image, or equivalent semiotic setting in which the external link Y 1002 was originally embedded in the incoming electronic messages to mailbox server 110. However, link Z 1003 will operate differently than external link Y 1002.

A system created link such as link Z 1003 can operate differently than the original link received by the system such as external link Y 1002. In particular, the system created link can be designed to open a session between the device using the application and an external content server using a link from an external link server, such as external link X 1001, but then transparently serve the page implicated by external link Y 1002 as the landing page for the session. As such, the session will be opened using the link from external link server 1000 while, from the end user's perspective, the same content is provided as in the original link that was received in an electronic message. The functionality of the link can be enabled by storing the link to open the session and the link to the landing page in association with each other in a memory that is accessible to system server 120 such as memory 1004. For example, the links, such as link Z 1003 can be designed to open a session using an external link, such as external link X 1001, and transparently redirect using another external link, such as external link Y 1002. In keeping with the illustrated example, when a user using application 135 clicks on link Z 1003, the system could create a session 1101 between a browser on mobile device 130 and an external content server 1100. The session could be created using the external link X 1001 but the browser could then be provided with the page implicated by external link Y 1002. In this manner, the administrator of system 100 will obtain the incentive associated with the distribution of external link X 1001 without the need to overly clutter the user interface, thereby preserving the desired aesthetic of the content presentation of system 100.

With a greater control on how a user can interact with a brand and thereby shop online, these user activities are rewarded through points/rewards system. Rewardable actions include but not limited to when a user signs up with a retailer, completes a purchase, answers a survey, rate/review a deal, share a coupon, etc. These rewards can then be redeemed by any means of gift cards or other options available so to drive the channel usage. Cashback rewards are instantly verified through the e-receipts thereby eliminating the need for the users to upload their purchase receipts for verification and validations.

Figure 11:
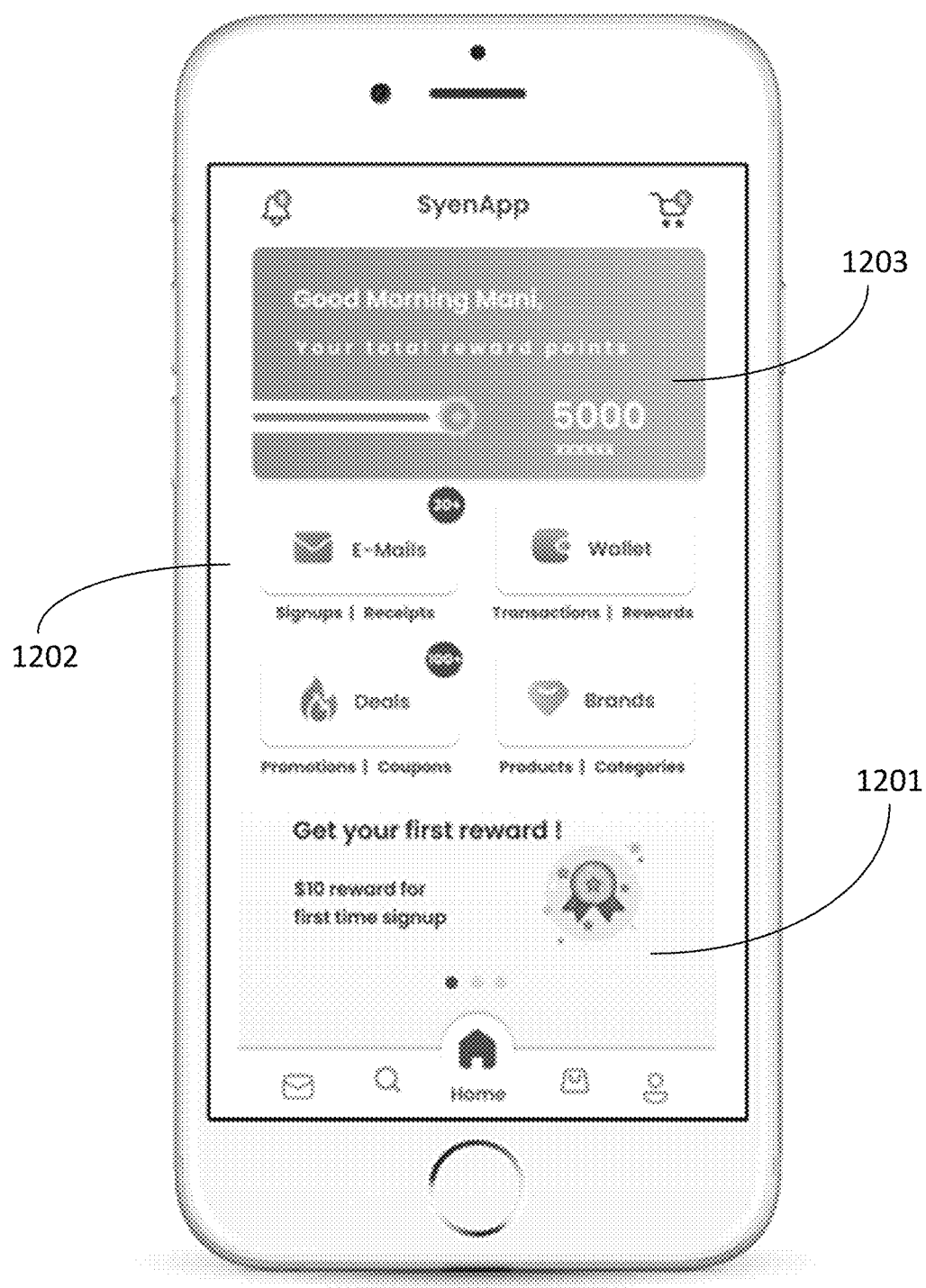
FIG. 11 includes a screenshot of a landing page user interface provided by an application in accordance with specific embodiments of the invention disclosed herein.

FIG. 11 includes a screenshot of a landing page user interface 1200 provided by an application in accordance with specific embodiments of the invention disclosed herein. The landing page illustrates a specific implementation of some of the embodiments described in the paragraph above. As illustrated, the user interface 1200 includes a reward redemption interface 1201 which is being provided to award the user points for signing up for the service. The user interface 1200 also includes a menu interface 1202 providing access to the extracted content mentioned above in the form of a wallet interface providing access to tracked transactions and rewards, a mailbox interface providing access to signups and receipts, a deals interface providing access to promotions and coupons, and a brand interface providing access to products and categories of goods and services offered by various brands. The incoming electronic messages to the system can all be categorized for presentation with the extracted content of those messages reconfigured and presented in an appealing fashion and accessible via those interfaces. The user interface 1200 also includes a rewards tracker 1203 which allows a user to track how many reward points they have received and how close they are to an additional level in order to add a layer of gamification to the collection of reward points in connection with use of the system.

Specific embodiments of the invention, such as specific implementations of system 100, provide significant benefits in that they bring communication and content into one channel for consumers and brands while providing both greater control and more privacy to consumers and higher conversion rate and brand recognition to brands and advertisers.

While the specification has been described in detail with respect to specific embodiments of the invention, it will be appreciated that those skilled in the art, upon attaining an understanding of the foregoing, may readily conceive of alterations to, variations of, and equivalents to these embodiments. Any of the method steps discussed above can be conducted by a processor operating with a computer-readable non-transitory medium storing instructions for those method steps. The computer-readable medium may be memory within a personal user device or a network accessible memory. Modifications and variations to the present invention may be practiced by those skilled in the art, without departing from the scope of the present invention, which is more particularly set forth in the appended claims.

What is claimed is:

1. A system comprising:
a system server, programmed to: receive a mobile number of a mobile device; associate the mobile number with a mailbox; and provide, in exchange for the mobile number and only the mobile number, a mailbox address for the mailbox;
a mailbox server, programmed to: provide the mailbox; and receive a set of electronic messages addressed to the mailbox address; and
a secure channel to communicate with an application on the mobile device, wherein the secure channel is secured using a message sent to the mobile number;
wherein the system server is further programmed to: extract content from the set of electronic messages to obtain extracted content; and transmit the extracted content to the application via the secure channel;
an extracted content database, wherein the system server stores the extracted content in the extracted content database;
wherein the extracted content database permits the application to accesses a portion of the extracted content;
wherein the portion of the extracted content is associated with the mobile number;
a classifier on the system server that classifies the electronic messages in the set of electronic messages into a set of classes; and
wherein an attribute of the extracted content in the extracted content database identifies a class in the set of classes.

2. The system of claim 1, wherein:
the mailbox address is a tokenized identification for a user; and
the tokenized identification is never associated with any electronic message sent from the application using simple mail transfer protocol (SMTP) or post office protocol (POP).

3. The system of claim 1, wherein:
the secure channel is provided on an applications programming interface between the application and the system; and
the secure channel is secured using the mobile number by restricting the applications programming interface to only function with the mobile device having the mobile number.

4. The system of claim 1, wherein:
the secure channel is secured using the mobile number by: (1) transmission of a confirmation code to the mobile device from the system; and (ii) receipt of the confirmation code from the application by the system.

5. The system of claim 1, further comprising:
a database of registered senders, wherein the database associates multiple sender addresses per registered sender; and
wherein the set of electronic messages have sender address attributes which include the multiple sender addresses per registered sender;
wherein the mailbox server uses the database of registered senders to discretize the extracted content on a per registered sender basis.

6. The system of claim 5, wherein:
the database of registered senders is not editable using the application.

7. The system of claim 5, wherein:
the system server: (i) uses the database of registered senders as a whitelist; and
(ii) one of quarantines and deletes received electronic mail from any sender that is not on the whitelist.

8. The system of claim 1, wherein:
the set of classes include at least two classes selected from: promotions, password resets, confirmations, and receipts.

9. The system of claim 1, wherein the system server is programmed to:
store a first external link from the set of electronic messages;
store a second external link; and
send a third link to the mobile device;

wherein the third link is designed to: (i) opens a session using the second external link and (ii) transparently redirect using the first external link.

10. A method, in which each step is conducted by a computerized system executing stored instructions, comprising:
receiving, using a system server, a mobile number of a mobile device;
associating, using the system server, the mobile number with a mailbox;
providing, using the system server and in exchange for the mobile number and only the mobile number, a mailbox address for the mailbox;
providing, using a mailbox server, the mailbox;
receiving, using the mailbox server, a set of electronic messages addressed to the mailbox address;
communicating, using a secure channel, with an application on the mobile device, wherein the secure channel is secured using a message sent to the mobile number;
extracting, using the system server, content from the set of electronic messages to obtain extracted content; and
transmitting, using the system server, the extracted content to the application via the secure channel;
storing, using the system server, the extracted content in an extracted content database;
permitting, using the extracted content database, the application to accesses a portion of the extracted content;
wherein the portion of the extracted content is associated with the mobile number;
classifying, using a classifier on the system server, the electronic messages in the set of electronic messages into a set of classes; and
wherein an attribute of the extracted content in the extracted content database identifies a class in the set of classes.

11. The method of claim 10, wherein:
the secure channel is provided on an applications programming interface between the application and the computerized system; and
the secure channel is secured using the mobile number by restricting the applications programming interface to only function with the mobile device having the mobile number.

12. The method of claim 10, wherein:
the secure channel is secured using the mobile number by: (1) transmitting a confirmation code to the mobile device from the system; and (ii) receiving the confirmation code from the application by the system.

13. The method of claim 10, further comprising:
associating multiple sender addresses per each registered sender in a set of registered senders in a database of registered senders; and
wherein the set of electronic messages have sender address attributes which include the multiple sender addresses per registered sender;
wherein the mailbox server uses the database of registered senders to discretize the extracted content on a per registered sender basis.

14. The method of claim 13, further comprising:
whitelisting, using the system server, the database of registered senders; and
one of: quarantining and deleting received electronic mail from any sender that is not whitelisted.

15. The method of claim 10, further comprising:
storing a first external link from a set of electronic messages;
storing a second external link; and
sending a third link to the mobile device;
wherein the third link is designed to: (i) open a session using the second external link and (ii) transparently redirect using the first external link.

* * * * *